US012747679B2

(12) United States Patent
Listorti et al.

(10) Patent No.: US 12,747,679 B2
(45) Date of Patent: Sep. 29, 2026

(54) SYSTEM FOR ASSEMBLING A TURBOMACHINE

(71) Applicant: NUOVO PIGNONE TECNOLOGIE-S.R.L., Florence (IT)

(72) Inventors: Marco Listorti, Florence (IT); Fabio Curini Galletti, Florence (IT); Alessandro Carciofi, Florence (IT); Riccardo Bartalucci, Florence (IT)

(73) Assignee: Nuovo Pignone Tecnologie S.R.L., Florence (IT)

( * ) Notice: Subject to any disclaimer, the term of this patent is extended or adjusted under 35 U.S.C. 154(b) by 0 days.

(21) Appl. No.: 18/730,626

(22) PCT Filed: Jan. 20, 2023

(86) PCT No.: PCT/EP2023/025025
§ 371 (c)(1),
(2) Date: Jul. 19, 2024

(87) PCT Pub. No.: WO2023/138903
PCT Pub. Date: Jul. 27, 2023

(65) Prior Publication Data

US 2025/0172073 A1 May 29, 2025

(30) Foreign Application Priority Data

Jan. 24, 2022 (IT) ........................ 102022000001070

(51) Int. Cl.
*F01D 25/28* (2006.01)

(52) U.S. Cl.
CPC ........ *F01D 25/285* (2013.01); *F05D 2230/64* (2013.01); *F05D 2230/68* (2013.01)

(58) Field of Classification Search
CPC .... B66F 9/07577; F01D 25/28; F01D 25/285; F05D 2230/68; F05D 2240/90
See application file for complete search history.

(56) References Cited

U.S. PATENT DOCUMENTS

2007/0033795 A1* 2/2007 McCaffrey .............. B66C 11/12 29/559
2015/0361894 A1* 12/2015 Murphy ................ F01D 25/285 29/888.012

FOREIGN PATENT DOCUMENTS

EP 1 752 409 A2 2/2007
EP 2 955 339 A1 12/2015
(Continued)

OTHER PUBLICATIONS

Written Opinion of the International Searching Authority for International Application No. PCT/EP2023/025025 (Year: 2023).*

*Primary Examiner* — Christopher J. Besler
(74) *Attorney, Agent, or Firm* — Paul Frank + Collins P.C.

(57) ABSTRACT

A system for assembling a turbomachine allowing assembly of at least two turbomachine modules placed on different supports: a first slide configured to support a first turbomachine module and base configured to support a second turbomachine module. The system further comprises a guide, in particular a track comprising two rails. The first slide is configured to perform movements along a longitudinal and typically horizontal direction defined by the guide. The first slide is further configured to enable adjustments of a position of the first turbomachine module by translating the first turbomachine module along a transversal direction and/or a vertical direction and/or the longitudinal direction. The mechanical coupling of the first module and the second module for assembling the turbomachine derives at least from a movement of the first module on the guide along the first direction toward the second module.

20 Claims, 4 Drawing Sheets

(56) References Cited

FOREIGN PATENT DOCUMENTS

| | | | |
|---|---|---|---|
| JP | S5981026 | U | 5/1984 |
| JP | 2004115174 | A | 4/2004 |
| JP | 2007051008 | A | 3/2007 |
| KR | 100428531 | B1 | 4/2004 |
| KR | 101808453 | B1 | 1/2018 |
| RU | 2451805 | C2 | 5/2012 |
| RU | 2770344 | C2 | 4/2022 |
| WO | 2008/073145 | A2 | 6/2008 |
| WO | 2017/213848 | A1 | 12/2017 |
| WO | 2019002725 | A1 | 1/2019 |

* cited by examiner

SYSTEM FOR ASSEMBLING A TURBOMACHINE

TECHNICAL FIELD

The subject-matter disclosed herein relates mainly to a system for assembling a turbomachine.

BACKGROUND ART

Typically, turbomachines, for example gas turbines, are made of various (complex) modules which are assembled together in a final assembly station before delivery to the customer. It is to be noted that the tolerances required for the assembly of these machines are very fine. At the state of the art, two different ways are known for the final assembly of the turbomachine: a first way is to assemble different turbomachine modules horizontally (i.e. positioning the axes of the modules horizontally) wherein the modules are suspended and are moved horizontally to be coupled together and form a horizontally-positioned turbomachine, and a second way is to assemble different turbomachine modules vertically (i.e. positioning the axes of the modules vertically) wherein the modules are suspended and are moved vertically to be coupled together and form a vertically-positioned turbomachine laid on the ground.

However, both these assembly methods have disadvantages, especially in terms of safety and repeatability of the assembly operation. In particular, known horizontal assembly methods are performed between two suspended modules, which therefore make precise coupling more difficult. On the other hand, known vertical assembly methods strongly expose the modules to the force of gravity, which could cause damage both to the modules themselves, for example due to collisions or frictions between modules, and expose operators who are working with the modules to safety risks, for example when having their arms between the modules to perform their coupling. In fact, both these methods (horizontal or vertical suspended) expose operators to safety risks in case of dropped objects and obligate the operators to drive manually at least one body to find the correct alignment between the modules, so that they have to stay under or very close to a suspended item.

SUMMARY

It would be desirable to have a system for assembling a turbomachine which is safer, without suspended items and that allows to adjust the coupling between the modules so that, for example, it could be repeated in the same way for each item of the same turbomachine model.

According to an aspect, the subject-matter disclosed herein relates to a system for assembly a turbomachine which can couple two or more turbomachine modules, wherein at least a first turbomachine module may move along a first direction on a guide, for example a track comprising two parallel rails, and at least a second turbomachine module is supported by a base so that the coupling between the turbomachine modules is performed due to the a movement of a first turbomachine module on the guide toward the second turbomachine module.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figures 1A, 1B:
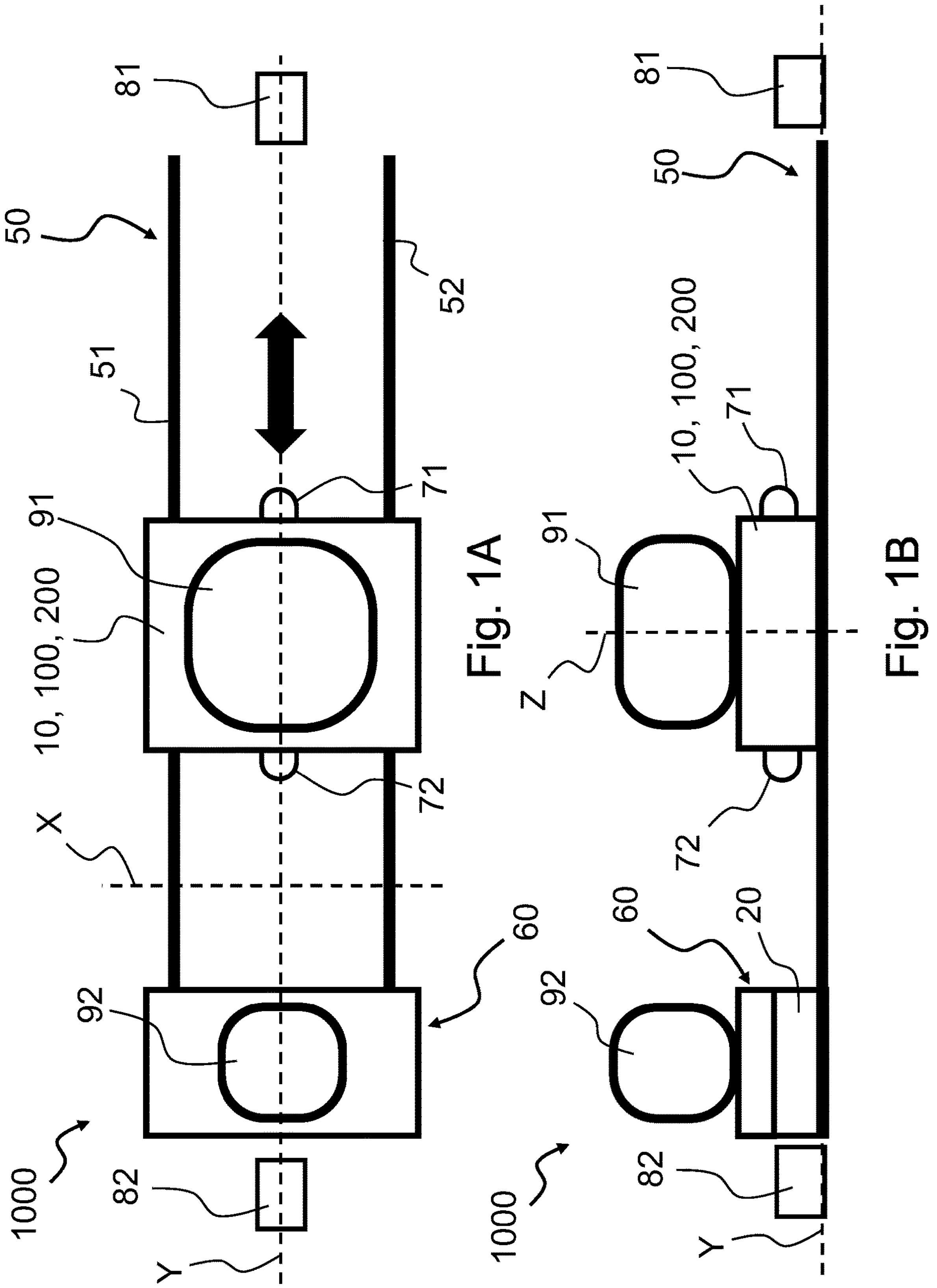
FIG. 1A and FIG. 1B show a much simplified diagram of an embodiment of a system for assembling a turbomachine.

According to an aspect, the subject-matter disclosed herein relates mainly to a system for assembling a turbomachine made by different modules; in particular an aeroderivative gas turbine. The system allows to assemble horizontally at least two turbomachine modules which are placed on different supports: at least one of the supports can move, in particular slide, along a guide that defines a longitudinal direction, as well as a transversal direction and a vertical direction. The mechanical coupling of the turbomachine modules is performed at least by moving at least one turbomachine module along the longitudinal direction. Moreover, the alignment of the two turbomachine modules, in particular the alignment of the axis of the two turbomachine modules, can be done by adjusting the position of at least one turbomachine module, preferably both turbomachine modules, along the longitudinal direction, the transversal direction and the vertical direction. Advantageously, the adjustments of the turbomachine modules can be done using linear actuators configured to translate the turbomachine modules along the longitudinal direction, the transversal direction and the vertical direction and/or to rotate the turbomachine modules around an axis.

Reference now will be made in detail to embodiments of the disclosure, examples of which are illustrated in the drawings. The examples and drawing figures are provided by way of explanation of the disclosure and should not be construed as a limitation of the disclosure. In fact, it will be apparent to those skilled in the art that various modifications and variations can be made in the present disclosure without departing from the scope or spirit of the disclosure. In the following description, similar reference numerals are used for illustration of the figures of the embodiments to indicate elements performing the same or similar functions. Moreover, for clarity of illustration, some references may be not repeated in all the figures.

In FIG. 1A and FIG. 1B there are shown respectively a top view and a side view of a much simplified diagram of an embodiment of a system for assembling a turbomachine generally indicated with reference numeral 1000. The system 1000 comprises a guide 50, typically placed horizontally on the ground, for example on the floor of a building; in particular, the guide lies on the ground so that the modules of the turbomachine may be assembled by sliding on the guide, as it will be better described in the following. The guide 50 defines:

- a first direction Y, the first direction Y being a longitudinal (and typically horizontal) direction and being preferably the main direction of development of the guide 50;
- a second direction X, the second direction X being a transversal direction perpendicular to the first direction Y, and a third direction Z, the third direction Z being a vertical direction perpendicular to the first direction Y and to the second direction X.

Advantageously, the guide 50 is a track comprising preferably two rails 51 and 52. However, it should be noted that the number of rails can be different. Preferably, the rails 51 and 52 are parallel and in some cases the rails 51 and 52 develop along a first and a second axes parallel to the longitudinal direction Y.

With non-limiting reference to FIG. 1, the system 1000 further comprises:

a first slide 10, 100, 200 (it is to be noted that the first slide 10 in FIG. 1 may be realized for example as the embodiment 100 of the slide in FIG. 2 or the embodiment 200 of the slide in FIG. 3) which is configured to support, preferably isostatically, a first turbomachine module 91 and which is configured to perform movements on the guide 50 along the first direction Y, and a base 60 which is configured to support, preferably isostatically, a second turbomachine module 92, and which is positioned and configured so that an axis of the second turbomachine module 92 corresponds to the axis A of the turbomachine and is parallel to the first direction Y.

In other words and as it will better explained in the following, the system 1000 is configured so that the first turbomachine module 91 and the second turbomachine module 92 can be assembled in such a way that the respective axes of the turbomachine modules 91 and 92 coincide with the axis A of the turbomachine. The mechanical coupling of the first turbomachine module 91 and the second turbomachine module 92 for assembling the turbomachine derives at least from a movement of the first turbomachine module 91 on the guide 50 along the first direction Y toward the second turbomachine module 92 (see the big black arrow in FIG. 1A). Alternatively, the axis of the second turbomachine module 92 may not be parallel to the first direction Y (but slightly inclined) and the mechanical coupling of the first turbomachine module 91 and the second turbomachine module 92 still derives at least from a movement of the first turbomachine module 91 on the guide 50 along the first direction Y toward the second turbomachine module 92, for example in such a way that the coupling surfaces of the first turbomachine module 91 and of the second turbomachine module 92 to be assembled are coplanar with each other. For example, the first slide 10 can be a carriage which has at least four wheels or can be a sledge, performing movements on the guide 50 along the first direction Y. Advantageously, the vertical position of one or two or more of the wheels is adjustable, so that the wheels can be easily disengaged from the rail and/or the ground.

Preferably, the system 1000 further comprises a winch 81 positioned at an end of the guide 50 for moving at least one slide of the system along the first direction Y. As shown in FIGS. 1A and 1B, the system 1000 may comprise a first winch 81 positioned at a first end of the guide 50 for moving the at least one slide along the first direction Y in a first sense, and a second winch 82 positioned at a second end of the guide 50 for moving the at least one slide along the first direction Y in a second sense. Advantageously, the at least one slide has a hook, preferably two hooks 71 and 72: a first hook 71 located towards the first end of the guide 50 and a second hook 72 located towards the second end of the guide 50, so that the first hook 71 can be coupled with the first winch 81, in particular with an end of a first rope of the first winch 81, and the second hook 72 can be coupled with the second winch 81, in particular with an end of a second rope of the second winch 82.

The first slide 10 is configured to enable adjustments of a position of the first turbomachine module 91 by translating the first turbomachine module 91 along the second direction X and/or the third direction Z. Preferably, the first slide 10 is further configured to enable adjustments of a position of the first turbomachine module 91 by translating the first turbomachine module 91 along the first direction Y.

Advantageously, the first slide 10 comprises at least one linear actuator, wherein the at least one linear actuator is configured to translate the first turbomachine module 91 along the first direction Y or the second direction X or the third direction Z. Preferably, as it will be apparent from the following, the first slide 10 comprises more than one linear actuator, for example a plurality of linear actuators, configured to translate the first turbomachine module 91 along the first direction Y and/or the second direction X and/or the third direction Z. Advantageously, the one or more linear actuators are further configured to rotate (for example of few degrees) the first turbomachine module 91 around an axis oriented as the first direction Y and/or the second direction X and/or the third direction Z. Preferably, the linear actuator (s) are worm screw or pneumatic cylinders or hydraulic cylinders.

Figure 2:
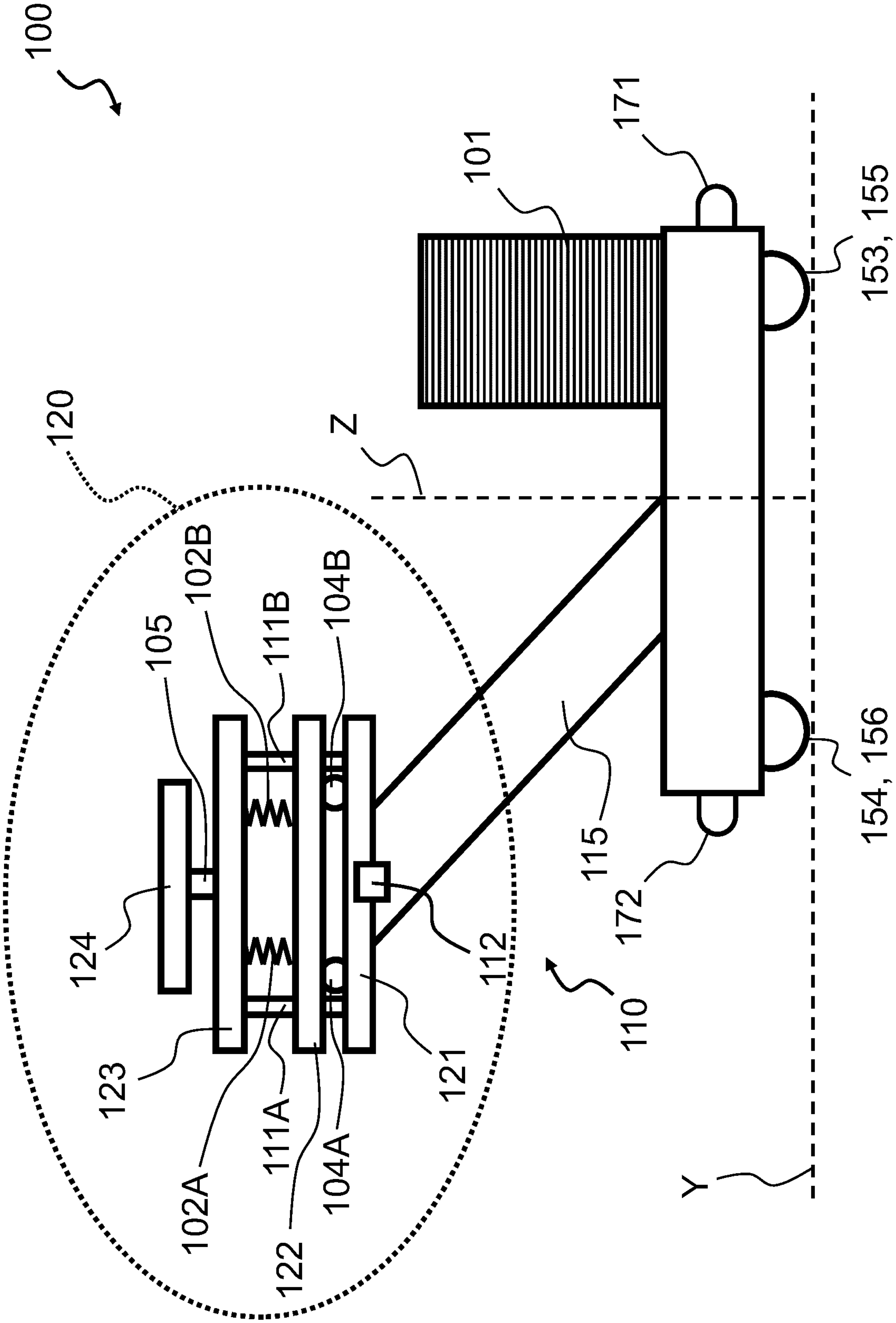
FIG. 2 shows a simplified diagram of an embodiment of a first slide of a system for assembling a turbomachine.

In FIGS. 2 and 3 are shown simplified diagrams of embodiments 100 and 200 of the first slide that is shown only in a much simplified way in FIG. 1. FIG. 2 shows an embodiment of a first slide 100 having e.g. four wheels 153, 154, 155 and 156 (please note that only two of them are visible in FIG. 2) arranged to rotate on the rails 51 and 52 so the first slide 100 can translate along the first direction Y. The first slide 100 has preferably two hooks 171, 172 configured to be respectively coupled with a first winch 81 and a second winch 82 to move the first slide 100 along the first direction Y.

As already explained above, the first slide 100 is arranged to support the first turbomachine module (not shown in FIG. 2); in particular, the first turbomachine module 91 supported by the first slide 100 may have a shaft which extends according to the first direction Y. In some embodiments, the shaft may extend approximately according to the first direction Y (the shaft might be subject to a bending deformation if supported only at one end, i.e. if cantilevered). Advantageously, the system 1000 further comprises a support shaft to be coupled for example with a free end of the shaft while assembling the turbomachine. Advantageously, the system 1000 further comprises a laser system, in particular a laser system having four lasers arranged in a cross shape (which are known per se to the persons skilled in the art): the lasers may detect the position of the shaft of the first turbomachine module 91 while sliding inside the second turbomachine module 92 according to the first direction Y. As it will be apparent from the following, the detection of the position of the shaft helps to adjust the position of the first turbomachine module 91. It is to be noted that the use of lasers (for accurately adjusting one or more position of a turbomachine module before and/or during mechanical coupling of turbomachine modules), in particular a laser system having four lasers arranged in a cross shape, is not intended to be limited to the embodiment shown in FIG. 2, but could be applied to other embodiments, in particular to the embodiments shown in FIG. 3 and FIG. 4.

In order to facilitate the mechanical coupling of the first turbomachine module 91 and the second turbomachine module 92, the first slide 100 may have a support system 110 which extends at least partially beyond the wheels 153, 154, 155, 156 of the first slide 100. Advantageously, the support system 110 comprises a base 120 and a rod 115, for example a long-inclined arm fixed to the carriage so that the base projects beyond the carriage; the support system 110, in particular the base 120 of the support system 10, is configured to support the first turbomachine module 91. It will be clear to those skilled in the art that, when the first turbomachine module 91 is supported by the first slide 100, in particular by the support system 110, the position of a center of gravity of the first slide 100 is displaced beyond the position of the wheels 154 and 156. Advantageously, the first slide 100 further comprises counterweights 101 for balancing the first slide 100 due to the fact that the position of the center of gravity of the first slide 100 is not only decentralized with respect to the wheels but it is also outside the support area defined by the wheels 153, 154, 155 and 156.

Advantageously, the base 120 of the first slide 100 may further comprise at least one guide 111, preferably four guides 111 (it is to be noted that in FIG. 2 only two guides 111A and 111B are shown), configured to avoid movements of the first turbomachine module 91 along the first direction Y and the second direction X. Advantageously, the base 120 of the first slide 100 may further comprise at least one linear actuator 112, preferably a plurality of linear actuators 112, configured to translate the first turbomachine module 91 along the third direction Z. Advantageously, the linear actuator(s) are arranged between the base 120 and the rod 115; in particular, the linear actuator(s) 112 are mechanically coupled to the base 120 and the rod 115. Preferably, the linear actuator(s) are worm screw or pneumatic cylinders or hydraulic cylinders.

With non-limiting reference to FIG. 2, the base 120 may comprise a plurality of supporting plates 121, 122, 123 and 124 mechanically coupled to each other, as it will be better explained in the following. A first supporting plate 121 may be mechanically coupled to the rod 115 and may be translated by means of the linear actuator(s) 112. Advantageously, the base 120 may further comprise at least one ball joint 104, preferably four ball joints 104 (it is to be noted that in FIG. 2 only two ball joints 104A and 104B are shown) for accommodating reaction movements of the first turbomachine module 91 during mechanical coupling of the turbomachine modules. In particular, the ball joint(s) 104 may be arranged between the first supporting plate 121 and a second supporting plate 122. More in particular, the ball joint(s) 104 are configured to cancel the components of the forces and loads along the first direction Y and/or the second direction X and to allow the self-adjustment of the position of the module 91 along the first direction Y and/or the second direction X and the rotation around the third direction Z during the mechanical coupling. The second supporting plate 122 may be mechanically coupled to a third supporting plate 123. Advantageously, the guides 111 are arranged between the second supporting plate 122 and the third supporting plate 123, possibly between the first supporting plate 121 and the third supporting plate 123. Advantageously, the base 120 may further comprises at least one spring 102, preferably four springs 102 (it is to be noted that in FIG. 2 only two springs 102A and 102B are shown). Preferably, the spring(s) 102 are preloaded springs, configured to reduce the forces, typically along the third direction Z, exerted between the turbomachine modules during their mechanical coupling, in particular thanks to the reaction force of the spring(s) 102. In other words, the springs 102A and 102B help to support from below the turbomachine module 91 to be assembled. The turbomachine module 91 may be arranged on the fourth supporting plate 124 which is mechanically coupled to the third supporting plate 123. Advantageously, a load cell 105 is arranged between the third supporting plate 123 and the fourth supporting plate 124 in order to generate an electrical signal about the variation of loads and forces along the third direction Z exerted between the turbomachine modules during their assembly; advantageously, the electric signal generated by the load cell 105 is supplied, for example though a wired connection, to a display (not shown in the figures) on which an operator may check the variation of loads and forces in real time. It is to be noted that the use of springs (for reducing forces exerted between turbomachine modules during mechanical coupling of turbomachine modules) and/or ball joints (for accommodating reaction movements of a turbomachine module during mechanical coupling of turbomachine modules) is very advantageous and is not intended to be limited to the embodiment shown in FIG. 2, but could be applied to other embodiments, in particular to the embodiments shown in FIG. 3 and FIG. 4.

It is to be noted that, at the state of the art, the turbomachine modules are assembled suspended. In particular, at least one of the turbomachine modules is moved horizontally or vertically to be coupled to another turbomachine module in order to form a horizontally-positioned or a vertically-positioned turbomachine. It is also to be noted that the support of a suspended turbomachine module is much easier: in fact, four tie rods for each module are enough to assure all the degrees of freedom of the turbomachine module.

Figure 3B:
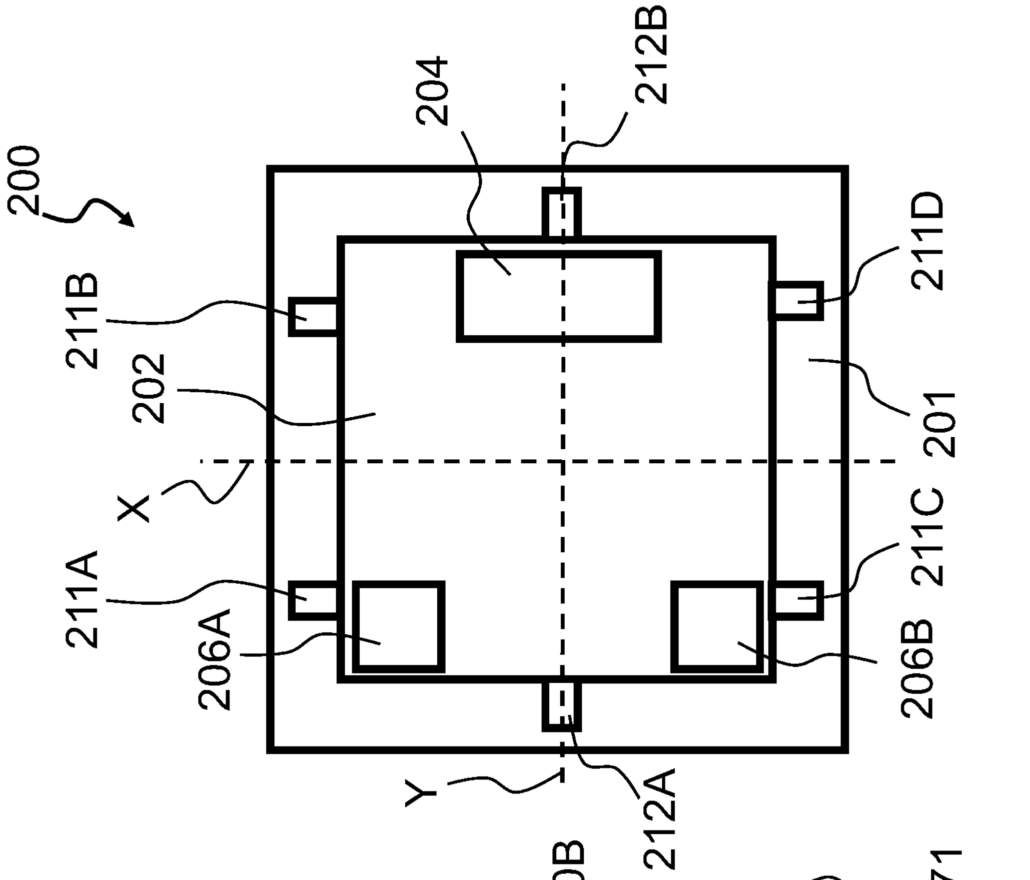
FIG. 3A and FIG. 3B show a simplified diagram of another embodiment of a first slide of a system for assembling a turbomachine.
Figure 3A:
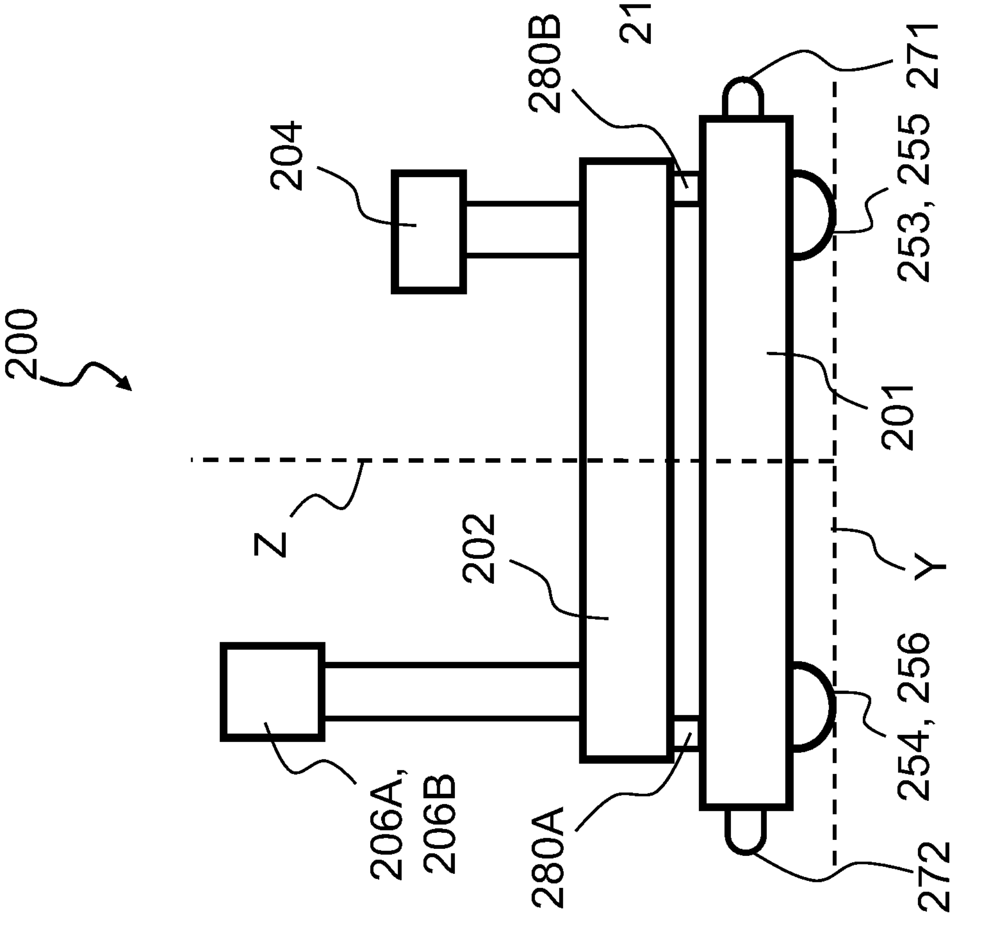

FIGS. 3A and 3B show two views of another embodiment of a first slide 200 having four wheels 253, 254, 255 and 256 (please note that only two of them are visible in FIG. 3A) arranged to rotate on the rails 51 and 52 so the first slide 200 can translate along the first direction Y. The first slide 200 has preferably two hooks 271, 272 configured to be respectively coupled with a first winch 81 and a second winch 82 to move the first slide 200 along the first direction Y.

As already explained above, the first slide 200 is arranged to support the first turbomachine module (not shown in FIGS. 3A and 3B). Advantageously, the first slide 200 comprises a first frame 201, which preferably comprises the wheels 253, 254, 255, 256 and which is supported by the guide 50, and a second frame 202 which is supported by the first frame 201 and which is configured to support the first turbomachine module. Advantageously, the first frame 201 and/or the second frame 202 is/are configured to enable adjustments of a position of the second frame 202 with respect to the first frame 201 by translating and/or rotating the second frame 202 with respect to the first frame 201. It is to be noted that adjustments of the position of the second frame 202 may correspond to adjustments of the position of the first turbomachine module 91. In particular, the first slide 200 may further comprise at least one slider 280, preferably four sliders 280 (it is to be noted that in FIG. 3A only two sliders 280A and 280B are shown), configured to accommodate reaction movements of the first turbomachine module during mechanical coupling of the turbomachine modules. In particular, the slider(s) 280 may be arranged between the first frame 201 and the second frame 202. More in particular, the slider(s) 280 are configured to cancel the components of the forces and loads along the first direction Y and/or the second direction X and to allow the self-adjustment of the position of the first turbomachine module along the first direction Y and/or the second direction X and the rotation around the third direction Z during the mechanical coupling.

Advantageously, the first slide 200 comprises at least one linear actuator, for example one of linear actuators 211A, 211B, 211C, 211D, 212A, 212B (see e.g. FIG. 3B wherein several linear actuators are shown) configured to translate the second frame 202 with respect to the first frame 201. Preferably, the linear actuator(s) are worm screw or pneumatic cylinders or hydraulic cylinders. For example, the linear actuator 212A, 212B may translate the second frame 202 along a first direction Y with respect to the first frame 201 and the linear actuator 211A, 211B, 211C, 211D may translate the second frame 202 along a second direction X with respect to the first frame 201 for example through appropriate coordinated movements.

Advantageously, the first slide 200 comprises at least two linear actuators, for example two of linear actuators 211A, 211B, 211C, 211D, 212A, 212B (see e.g. FIG. 3B wherein several linear actuators are shown) configured to rotate the second frame 202 with respect to the first frame 201. For example, the linear actuators 211A and 211D, 211B and 211C may rotate the second frame 202 around the axis directed as the third direction Z for example through appropriate coordinated movements.

With non-limiting reference to FIGS. 3A and 3B, advantageously, the second slide 200 comprises a rolling support 204, in particular with rollers, for rotatably supporting the first turbomachine module 91. In particular, the rolling support 204 allows to rotate the first turbomachine module 91 around an axis substantially parallel to the first direction Y. Advantageously, the rolling support 204 is configured also to enable adjustments of the position of the first turbomachine module 91, for example by translating the first turbomachine module 91 along the third direction Z, for example by changing the position of the rolling support 204 with respect to the second frame 202.

With non-limiting reference to FIGS. 3A and 3B, advantageously, the second slide 200 further comprises a mechanical jack, preferably two mechanical jacks 206A and 206B configured to support the first turbomachine module 91. Advantageously, the mechanical jacks 206A and 206B are configured to enable adjustments of the position of the first turbomachine module 91 by translating the first turbomachine module 91 along the first direction Y and/or the second direction X and/or the third direction Z. It is to be noted that, for example by carrying out a different translation between the mechanical jack 206A and the mechanical jack 206B or by carrying out a different translation between the mechanical jack 206A and the mechanical jack 206B while changing the position of the rolling support 204 with respect for example to the second frame 202, the mechanical jacks 206A, 206B are configured also to enable adjustments of the position of the first turbomachine module 91 by rotating the first turbomachine module 91 around the axis oriented as the first direction Y and/or the second direction X and/or the third direction Z.

According to another embodiment, the system 1000 further comprises a third slide configured to support, preferably isostatically, a third turbomachine module and configured to perform movements on the guide 50 along the first direction Y. In particular, the mechanical coupling of the third turbomachine module for assembling the turbomachine derives at least from a movement of the third turbomachine module on the guide 50 along the first direction Y. Preferably, the third slide is configured to enable adjustments of a position of the third turbomachine module by translating the third turbomachine module along the first direction Y and/or the second direction X and/or the third direction Z. It is to be noted that the third slide may be identical or similar to the slide 10 or 100 or 200. In other words, an innovative assembling system may comprise, in addition to at least one base (fixed or movable), two slides and the turbomachine may be made by assembling three or four or more turbomachine modules; for example, the system may comprise both one slide 100 as shown for example in FIG. 2 and one slide 200 as shown for example in FIGS. 3A and 3B.

As previously indicated, the system 1000 comprises a base 60 configured to support the second turbomachine module 92 to be mechanically coupled to the first turbomachine module 91. It is to be noted that the base 60 may be fixed to the (typically horizontal) ground, for example to the floor of a building, or, according to some embodiments, it may also slide along the guide 50. For example, the base 60 may comprise a second slide 20 (see FIG. 1B) configured to perform movements on the guide 50 along the first direction Y. For example, the second slide 20 can be a carriage which has at least four wheels or can be a sledge. Advantageously, the vertical position of one or two or more of the wheels is adjustable, so that the wheels can be easily disengaged from the rails and/or the ground. Advantageously, the second slide 20 is configured to support isostatically the second turbomachine module 92. As it will be clear to those skilled in the art, the mechanical coupling of the first turbomachine module 91 and the second turbomachine module 92 for assembling the turbomachine may derive only from a movement of the first turbomachine module 91 (e.g. on the guide 50) along the first direction Y towards the second turbomachine module 92 or from a movement of the first turbomachine module 91 (e.g. on the guide 50) along the first direction Y towards the second turbomachine module 92 and a movement of the second turbomachine module 92 (e.g. on the guide 50) along the first direction Y towards the first turbomachine module 91.

Advantageously, the system 1000 may further comprise another base 300 (see FIG. 4) configured to support, preferably isostatically, a fourth turbomachine module positioned and configured so that an axis of the fourth turbomachine module corresponds to the axis A of the turbomachine.

Figure 4B:
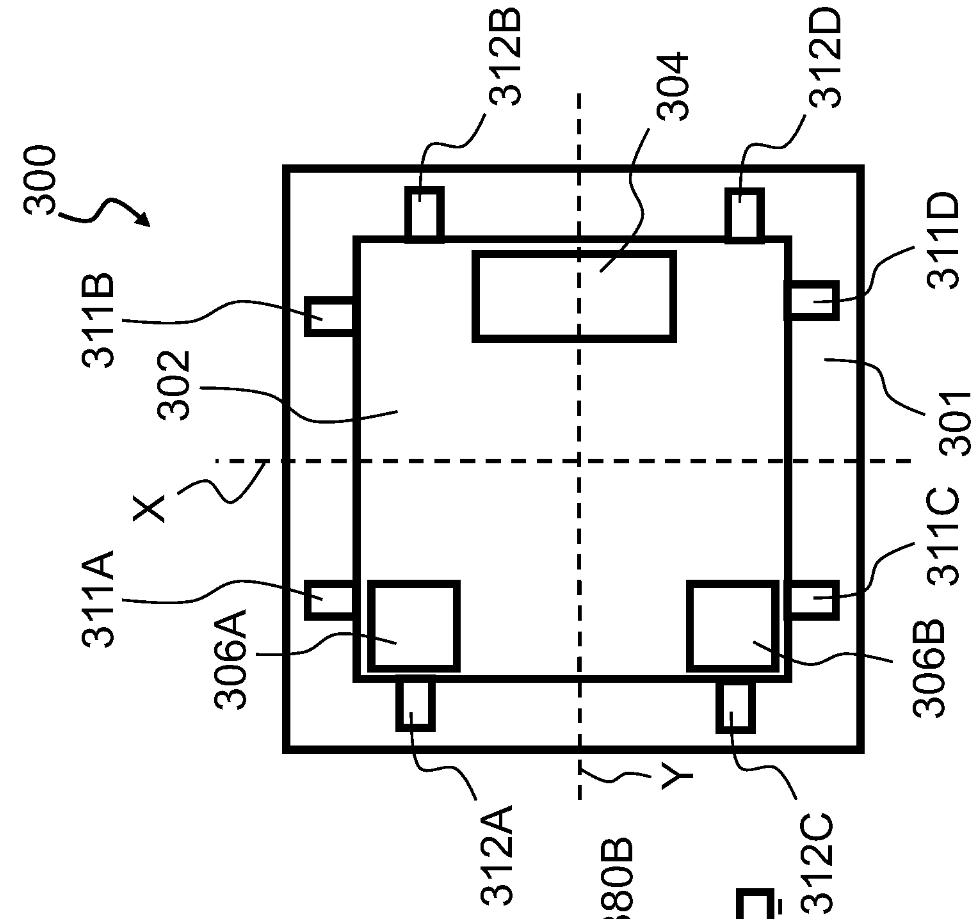
FIG. 4A and FIG. 4B show simplified diagram of an embodiment of a base of a system for assembling a turbomachine.
Figure 4A:
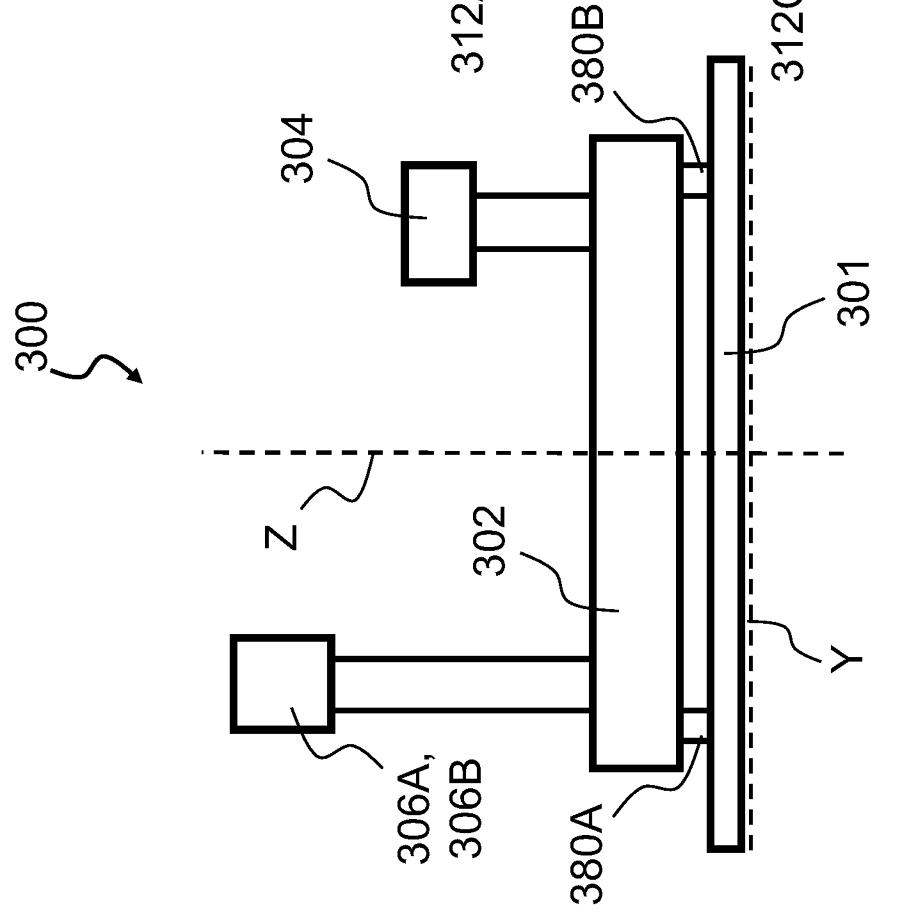

Advantageously, according to the embodiment of FIG. 4, the base 300 is configured to enable adjustments or movements of the fourth turbomachine module along the first direction Y and the mechanical coupling of the fourth turbomachine module for assembling the turbomachine may derive from an adjustment of the fourth turbomachine module along the first direction Y. As it will be apparent for the following, the base 300 is further configured to enable adjustments of a position of the fourth turbomachine module by translating the fourth turbomachine module along the second direction X and/or the third direction Z. Advantageously, the base 300 comprises a third frame 301, which is fixed to the (typically horizontal) ground, for example on the floor of a building, and a fourth frame 302 which is mechanically coupled to the third frame 301 and which is configured to support the fourth turbomachine module. Advantageously, the third frame 301 and/or the fourth frame 302 is/are configured to enable adjustments of a position of the fourth frame 302 with respect to the third frame 301 by translating and/or rotating the fourth frame 302 with respect to the third frame 301. It is to be noted that adjustments or movements of the position of the fourth frame 302 may correspond to adjustments of the position of the fourth turbomachine module. In particular, the base 300 may further comprise at least one slider 380, preferably four sliders 380 (it is to be noted that in FIG. 4A only two sliders 380A and 380B are shown), configured to accommodate reaction movements of the fourth turbomachine module during mechanical coupling of the turbomachine modules. In particular, the slider(s) 380 may be arranged between the third frame 301 and the fourth frame 302. More in particular, the slider(s) 380 are configured to cancel the components of the forces and loads along the first direction Y and/or the second direction X and to allow the self-adjustment of the position of the first turbomachine module along the first direction Y and/or the second direction X and the rotation around the third direction Z during the mechanical coupling.

With non-limiting reference to FIGS. 4A and 4B, the base 300 comprises at least one linear actuator, for example one of linear actuators 311A, 311B, 311C, 311D, 312A, 312B, 312C, 312D (see e.g. FIG. 4B wherein several linear actuators are shown) configured to translate the fourth frame 302 with respect to the third frame 301. Preferably, the linear actuator(s) are worm screw or pneumatic cylinders or hydraulic cylinders. For example, the linear actuator 312A, 312B, 312C, 312D may translate the fourth frame 302 along a first direction Y with respect to the third frame 301 and the linear actuator 311A, 311B, 311C, 311D may translate the fourth frame 302 along a second direction X with respect to the third frame 301.

Advantageously, the base 300 comprises at least two linear actuators, for example two of linear actuators 311A, 311B, 311C, 311D, 312A, 312B, 312C, 312D (see e.g. FIG. 4B wherein several linear actuators are shown) configured to rotate the fourth frame 302 with respect to the third frame 301. For example, the linear actuators 312A and 312D, 312B and 312C may rotate the fourth frame 302 around the axis directed as the third direction Z and the linear actuators 311A and 311D, 311B and 311C may rotate the fourth frame 202 around the axis directed as the third direction Z.

With non-limiting reference to FIGS. 4A and 4B, the base 300 comprises a rolling support 304, in particular with rollers, for rotatably supporting the fourth turbomachine module. Advantageously, the rolling support 304 is configured also to enable adjustments of the position of the fourth turbomachine module, for example by translating the fourth turbomachine module along the third direction Z, for example by changing the position of the rolling support 304 with respect to the fourth frame 302.

With non-limiting reference to FIGS. 4A and 4B, the base 300 further comprises a mechanical jack, preferably two mechanical jacks 306A, 306B configured to support the fourth turbomachine module. Advantageously, the mechanical jacks 306A, 306B are configured to enable adjustments of the position of the fourth turbomachine module by translating the fourth turbomachine module along the first direction Y and/or the second direction X and/or the third direction Z. It is to be noted that, for example by carrying out a different translation between the mechanical jack 306A and the mechanical jack 306B or by carrying out a different translation between the mechanical jack 306A and the mechanical jack 306B while changing the position of the rolling support 304 with respect for example to the fourth frame 302, the mechanical jacks 306A, 306B are configured also to enable adjustments of the position of the fourth turbomachine module by rotating the fourth turbomachine module around the axis oriented as the first direction Y and/or the second direction X and/or the third direction Z.

The system described above could be used for example for assembling a gas turbine engine (in particular of the aeroderivative type) having four turbomachine modules: a first turbomachine module, for example a module of High-Pressure (=HP) compressor and combustor (that may be called "core module") supported by a slide as shown in FIG. 3 or a base as shown in FIG. 4, a second turbomachine module, for example a module of High-Pressure (=HP) turbine and shaft supported by a slide as shown in FIG. 2, a third turbomachine module, for example a Low-Pressure (=LP) compressor supported by a slide as shown in FIG. 3 and a fourth turbomachine module, for example a Low-Pressure (=LP) turbine supported for example by a base as shown in FIG. 4. It is to be noted that one or more of these turbomachine modules may be assembled in the same place or in different places where final assembly as described herein occurs.

Assembly systems as described herein may be located at the premises of e.g. a turbine engine manufacturers. Furthermore, it may be useful to place an assembly system as described herein where or close to the place where a turbine engine is installed and used; in this way, a facility manager has the possibility to easily disassemble (and then reassemble) the turbine engine for example for maintenance purposes.

According to a possible method of assembling a turbomachine, for example a gas turbine engine, a first turbomachine module and a second turbomachine module may be supported respectively by a first module support associated to a guide, for example a slide, and by a second module support associated to the guide, for example a base (which indeed may be fixed or movable). Preferably, the first module support and the second module support are supported by the guide and may slide along the guide. For example, the first module support and the second module support may be the slide and the base of the system shown in FIG. 1; preferably, the first module support and the second module provide isostatic support to the turbomachine module(s). The first turbomachine module can be mechanically coupled to the second turbomachine module by simply moving the slide along the guide toward the base (which indeed may be fixed or movable) till abutment of at least a portion of the first turbomachine module and at least a portion of the second turbomachine module; in particular, the guide may be a track comprising one or more rails. The position of the first turbomachine module and/or the second turbomachine module may be adjusted before and/or during and/or after movement of the first and/or the second turbomachine module, for example by translating and/or rotating the first and/or second turbomachine module. Once that the first turbomachine module and the second turbomachine module are fixed together (through e.g. flanges in the modules) so to produce a first assembly, a third turbomachine module supported, preferably isostatically, for example by another slide placed on the guide, allowing the movement of the third turbomachine module along the guide toward the first assembly. The third turbomachine module can be mechanically coupled to the first assembly by simply moving the third turbomachine module and/or the first assembly along the guide till abutment of at least a portion of the third turbomachine module and at least a portion of the first assembly and then fixed together (through e.g. flanges in the modules) so to produce a second assembly. It is to be noted that the position of the third turbomachine module may be adjusted before and/or during and/or after movement of the third turbomachine module and/or the first assembly, for example by translating and/or rotating the third turbomachine module. Finally, the second assembly can be mechanically coupled to a fourth turbomachine module, supported for example by a base located at one end of the guide, by sliding the second assembly along the guide and allowing the movement of the second assembly toward the fourth turbomachine module. It is to be noted that the position of the fourth turbomachine module may be adjusted, for example by translating and/or rotating the fourth turbomachine module, before and/or during and/or after movement of the second assembly. It is to be noted that the position of a turbomachine module and/or an assembly of turbomachine modules on a module support is adjusted by translation along a longitudinal direction and/or by translation along a transversal direction by translation along a vertical direction and/or by rotation around a longitudinal direction and/or by rotation around a transversal direction by rotation around a vertical direction.

The invention claimed is:

1. A system for assembling a turbomachine having a first turbomachine module and a second turbomachine module, the system comprising:

a guide configured to reside on a surface;

a first slide disposed on the guide and arranged underneath the first turbomachine module when the first turbomachine module is placed thereon, the first slide comprising one or more springs and one or more ball joints;

a base disposed on one end of the guide and arranged underneath the second turbomachine module when the second turbomachine module is placed thereon, wherein the base is positioned and configured so that an axis of the second turbomachine module corresponds to an axis of the turbomachine, wherein the first slide is configured to translate on the guide in a first direction, wherein the first slide is configured to allow movement of the first turbomachine module in a second direction that is perpendicular to the first direction and in a third direction that perpendicular to the surface, wherein movement of the first slide in the first direction causes the first turbomachine module to engage with the second turbomachine module to form a mechanical coupling, wherein the one or more springs are preloaded to reduce forces during formation of the mechanical coupling between the first turbomachine module and the second turbomachine module, and wherein the one or more ball joints are configured to accommodate for reaction movements of the first turbomachine module during formation of the mechanical coupling between the first turbomachine module and the second turbomachine module.

2. The system of claim 1, further comprising:

a second slide disposed on the guide and arranged underneath the base, wherein the second slide is configured to move on the guide in the first direction, wherein movement of the first slide and the second in the first direction causes the first turbomachine module to engage with the second turbomachine module to form the mechanical coupling.

3. The system of claim 1, wherein the guide is a track comprising two rails.

4. The system of claim 1, wherein the first slide is configured to enable adjustments of a position of the first turbomachine module by translating the first turbomachine module along the first direction.

5. The system of claim 1, wherein the first slide is configured to enable adjustments of a position of the first turbomachine module by rotating the first turbomachine module around an axis oriented in the first direction.

6. The system of claim 1, wherein the first slide is configured to enable adjustments of a position of the first turbomachine module by rotating the first turbomachine module around an axis oriented in the second direction.

7. The system of claim 1, wherein the first slide is configured to enable adjustments of a position of the first turbomachine module by rotating the first turbomachine module around an axis oriented in the third direction.

8. The system of claim 1, wherein the first slide comprises:

a first frame supported by the guide, and a second frame supported by the first frame;

wherein the first frame and/or the second frame is/are configured to enable adjustments of a position of the second frame with respect to the first frame by translating and/or rotating the second frame with respect to the first frame.

9. The system of claim 1, wherein the second slide comprises a rolling support for rotatably supporting the first turbomachine module.

10. The system of claim 1, wherein the first slide further comprises counterweights for balancing the position of a center of gravity of the first slide when the first turbomachine module is supported by the first slide.

11. The system of claim 1, further comprising a support shaft to be coupled with the first turbomachine module while assembling the turbomachine.

12. The system of claim 1, further comprising:

a third slide configured to support a third turbomachine module and configured to perform movements on the guide along the first direction, wherein the third slide is configured to enable adjustments of a position of the third turbomachine module by translating the third turbomachine module along the first direction and/or the second direction and/or the third direction, whereby mechanical coupling of the third turbomachine module for assembling the turbomachine derives at least from a movement of the third turbomachine module on the guide along the first direction.

13. The system of claim 1, further comprising:

another base configured to support a fourth turbomachine module, positioned and configured so that an axis of the fourth turbomachine module corresponds to the axis of the turbomachine, wherein the another base is configured:

to enable adjustments or movements of the fourth turbomachine module along the first direction, to enable adjustments of a position of the fourth turbomachine module by translating the fourth turbomachine module along the second direction and/or the third direction, whereby mechanical coupling of the fourth turbomachine module for assembling the turbomachine derives at least from a movement of the fourth turbomachine module along the first direction.

14. The system of claim 1, further comprising at least one winch positioned at an end of the guide for moving at least one slide of the system along the first direction.

15. The system of claim 1, wherein the first slide bears weight of the first turbomachine as a force normal to the surface.

16. The system of claim 1, wherein the first turbomachine module contacts a top surface of the first slide.

17. The system of claim 1, wherein the second turbomachine module contacts a top surface of the base.

18. The system of claim 1, wherein the first turbomachine module and the second turbomachine module contact a top surface of the first slide and a top surface of the base, respectively.

19. The system of claim 1, wherein the first slide has a top surface that bears weight of the first turbomachine module.

20. The system of claim 1, wherein the base has a top surface that bears weight of the second turbomachine module.

* * * * *